United States Patent
Cho

(10) Patent No.: US 8,714,608 B2
(45) Date of Patent: May 6, 2014

(54) PIN-TYPE GRIPPER

(75) Inventor: Ho-Young Cho, Seoul (KR)

(73) Assignee: Korea Pneumatic System Co., Ltd., Seoul (KR)

( * ) Notice: Subject to any disclaimer, the term of this patent is extended or adjusted under 35 U.S.C. 154(b) by 0 days.

(21) Appl. No.: 13/820,191

(22) PCT Filed: Aug. 9, 2011

(86) PCT No.: PCT/KR2011/005786
§ 371 (c)(1),
(2), (4) Date: Mar. 1, 2013

(87) PCT Pub. No.: WO2012/033285
PCT Pub. Date: Mar. 15, 2012

(65) Prior Publication Data
US 2013/0187398 A1 Jul. 25, 2013

(30) Foreign Application Priority Data
Sep. 9, 2010 (KR) .................. 10-2010-0088175

(51) Int. Cl.
*B25J 15/00* (2006.01)
(52) U.S. Cl.
USPC ........................................ 294/61; 294/207
(58) Field of Classification Search
USPC ......... 294/61, 119.1, 192, 104, 106, 207, 8.6; 227/109, 120; 271/18.3; 901/37
See application file for complete search history.

(56) References Cited

U.S. PATENT DOCUMENTS

| | | | |
|---|---|---|---|
| 2,604,351 A * | 7/1952 | Alfred et al. ................... | 294/61 |
| 3,386,763 A | 6/1968 | Ottaway et al. | |
| 3,498,661 A * | 3/1970 | Graziano ...................... | 294/8.6 |
| 3,886,617 A | 6/1975 | Labran et al. | |
| 4,372,548 A | 2/1983 | Aurich et al. | |
| 4,444,384 A | 4/1984 | Keeton | |
| 4,688,837 A | 8/1987 | Ball et al. | |
| 4,874,194 A | 10/1989 | Borcea et al. | |
| 5,054,831 A * | 10/1991 | Ting et al. ...................... | 294/61 |
| 5,114,132 A * | 5/1992 | Arato et al. ................... | 271/18.3 |
| 5,116,094 A * | 5/1992 | Jones ........................ | 294/81.61 |
| 5,125,708 A | 6/1992 | Borcea et al. | |
| 5,513,945 A | 5/1996 | Hartmann et al. | |
| 6,092,848 A | 7/2000 | Maffeis et al. | |
| 6,309,001 B1 * | 10/2001 | Sherwin et al. ................ | 294/61 |
| 6,394,521 B1 | 5/2002 | Bertini | |

(Continued)

FOREIGN PATENT DOCUMENTS

| | | |
|---|---|---|
| JP | 05-057647 | 3/1993 |
| JP | 07-256582 | 10/1995 |

(Continued)

*Primary Examiner* — Saul Rodriguez
*Assistant Examiner* — Gabriela Puig
(74) *Attorney, Agent, or Firm* — Robert C. Klinger

(57) ABSTRACT

A pin-type gripper adapted for holding and transferring a target made of soft material. The pin-type gripper includes: a cylinder unit; a pair of slide blocks which are obliquely disposed at the left and right sides of the end of a piston rod and extend in a skirt shape; and links which transmit the piston motion to the slide blocks. A pin which pegs a target is installed on an end of each slide block. One cylinder unit controls two slide members at the same time. Thus, the pin-type gripper is superior in structure, control, and economic performance to a typical gripper that requires two cylinders and a complicated design.

6 Claims, 5 Drawing Sheets

(56) References Cited

U.S. PATENT DOCUMENTS

| | | |
|---|---|---|
| 7,506,908 B2 | 3/2009 | Metcalfe |
| 7,682,270 B2 | 3/2010 | De Buyer-Mimeure |
| 8,104,807 B2 | 1/2012 | Maffeis |
| 8,141,920 B2 * | 3/2012 | Butler et al. .................... 294/61 |
| 2011/0089709 A1 | 4/2011 | Neeper |

FOREIGN PATENT DOCUMENTS

| | | |
|---|---|---|
| JP | 09-225714 | 9/1997 |
| JP | 2000-317871 | 11/2000 |
| JP | 2005-333827 | 12/2005 |

* cited by examiner

PIN-TYPE GRIPPER

TECHNICAL FIELD

The present invention relates, in general, to pin-type grippers and, more particularly, to a pin-type gripper which uses pins to hold a target.

BACKGROUND ART

Generally, grippers refer to apparatuses which apply physical force or pressure to a target to hold it. Grippers are typically used in transfer systems. Particularly, pin-type grippers are mainly used to transfer targets made of soft material such as fabric, porous material, rubber, etc.

Referring to FIG. 1, a conventional pin-type gripper 1 includes two cylinders 3a and 3b which are installed in a housing 2 and are oriented to be inclined downwards in directions crossing each other. A plurality of pins 6a and 6b are respectively provided on ends of the piston rods 4a and 4b of the cylinders 3a and 3b by mounting blocks 5a and 5b. The pins 6a and 6b are oriented at predetermined inclination angles θ such that they cross each other.

In this conventional construction, when the rods 4a and 4b are extracted by the operation of the cylinders 3a and 3b, the pins 6a and 6b protrude downwards from the bottom of the housing 2 and extend to the left and the right. In this way, the pins 6a and 6b are obliquely pegged into the surface of a target P, thus making it possible to hold the target P and transfer it using the pin-type gripper 1.

The pin-type gripper can be effectively used to transfer a target made of soft material. However, because the conventional pin-type gripper uses two cylinders, the following problems arise.

First, the structure of the gripper is complex, and the size of the gripper, including the housing, is excessively large.

Second, a special and detailed design for controlling the two cylinders at the same time is required, resulting in a high possibility of malfunction or error.

Third, consequentially, a lot of time and effort are required to manufacture and operate the gripper.

DISCLOSURE

Technical Problem

Accordingly, the present invention has been made keeping in mind the above problems occurring in the prior art, and an object of the present invention is to provide a pin-type gripper which has a simple structure, is easily controlled compared to the conventional technique, and reduces the production cost and the operating cost. The inventor of the present invention recognized that the above object can be realized in such a way that a single cylinder unit controls two slide members at the same time, and designed the present invention to achieve the above object.

Technical Solution

In order to accomplish the above object, the present invention provides a pin-type gripper, including: a housing in which a cylinder unit and an actuating part are organically arranged, with pin holes formed in a bottom of the housing so that pins of side blocks are extracted from or retracted into the housing through the pin holes; the single cylinder unit comprising: a cylinder provided in an upper end of a medial portion of the housing; a piston reciprocating upwards and downwards in the cylinder; and a rod extending from the piston to a predetermined position below the cylinder; and the actuating part comprising: a pair of slide blocks obliquely disposed at left and right sides of an end of the rod, the slide blocks extending in a skirt shape, with one or more pins provided in an end of each of the pair of slide blocks; and links connected at first ends thereof to the rod and connected at second ends thereof to the respective slide blocks so that movement of the rod generated by the cylinder is transmitted to the slide blocks by the links.

Preferably, the piston may reciprocate by a means of the pressure of compression air which is supplied into the cylinder. For this, the housing may have two compression air supply holes extending from a side surface of the housing into the cylinder.

Furthermore, each of the links may include a 'v'-shaped member having a vertex as a rotating axis, wherein the first end and the second end of the link may respectively form opposite ends of the V-shaped member other than the vertex.

In addition, the pin-type gripper may further include a stopper provided in the bottom of the housing so as to be adjustable in height, the stopper extending to a predetermined position adjacent to the end of the rod such that when the rod moves to the predetermined position, the stopper is brought into contact with the end of the rod, whereby a lower limit of a movement range of the rod is defined.

Advantageous Effects

A pin-type gripper according to the present invention is configured such that a single cylinder unit simultaneously controls two slide members provided with pins. Therefore, the present invention is superior in structure, control, and economic performance to the conventional gripper which requires two cylinders and a complicated design. Furthermore, the present invention is advantageous in terms of the operation of the gripper in that there is little possibility of malfunction or error.

In a preferred embodiment of the present invention, the pin-type gripper can be configured such that an extent by which a slide block and pins are extracted can be adjusted in such a way as to change a range within which a rod can move. Therefore, in a transfer system, the pin-type gripper of the present invention can appropriately cope with a target, regardless of the material, size, weight, etc. of the target.

Figure 1:
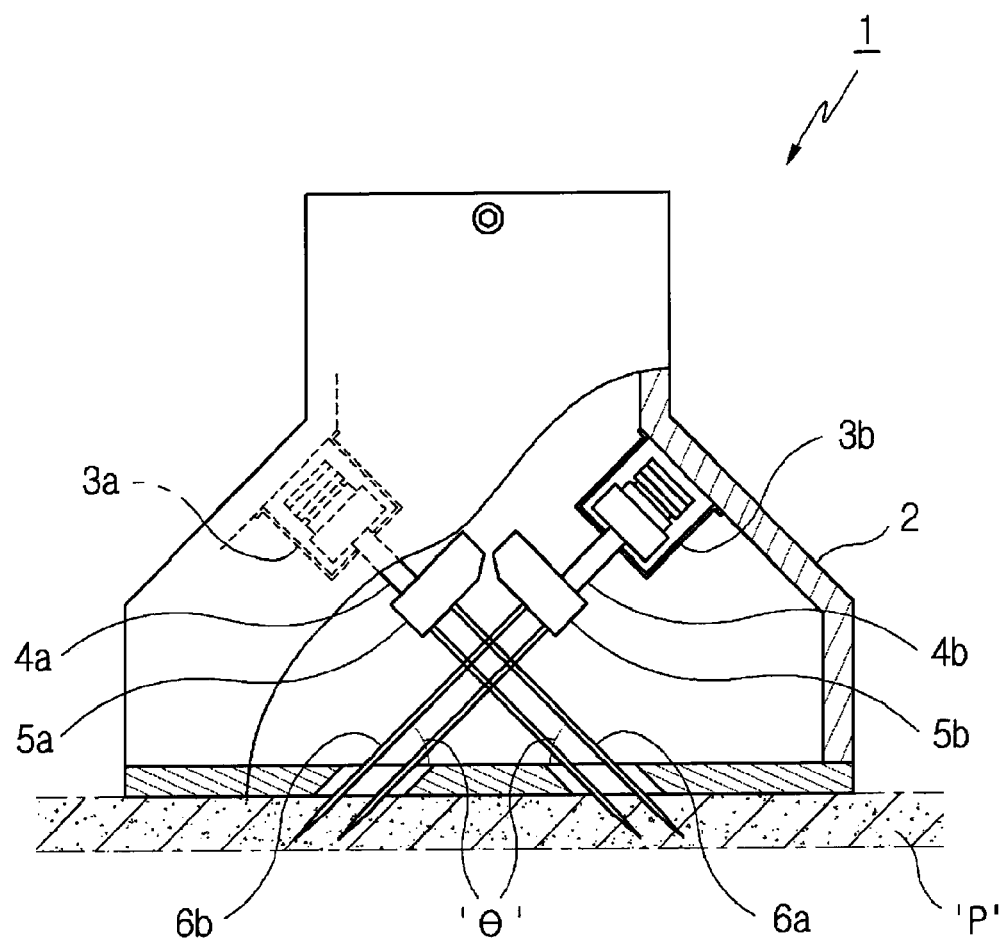
FIG. 1 is a sectional view showing the construction of a conventional pin-type gripper.

<Description of the Reference Numerals in the Drawings>

| | |
|---|---|
| 100. pin-type gripper | |
| 10. housing | 13. bottom plate |
| 14. pin-hole | 17. guide |
| 20. cylinder unit | |
| 21. cylinder | 22. piston |
| 23. rod | 30. actuating part |
| 31a, 31b. slide block | |

| <Description of the Reference Numerals in the Drawings> | |
| --- | --- |
| 32. pin | 33. link |
| 40. stopper | |

BEST MODE

Figure 2:
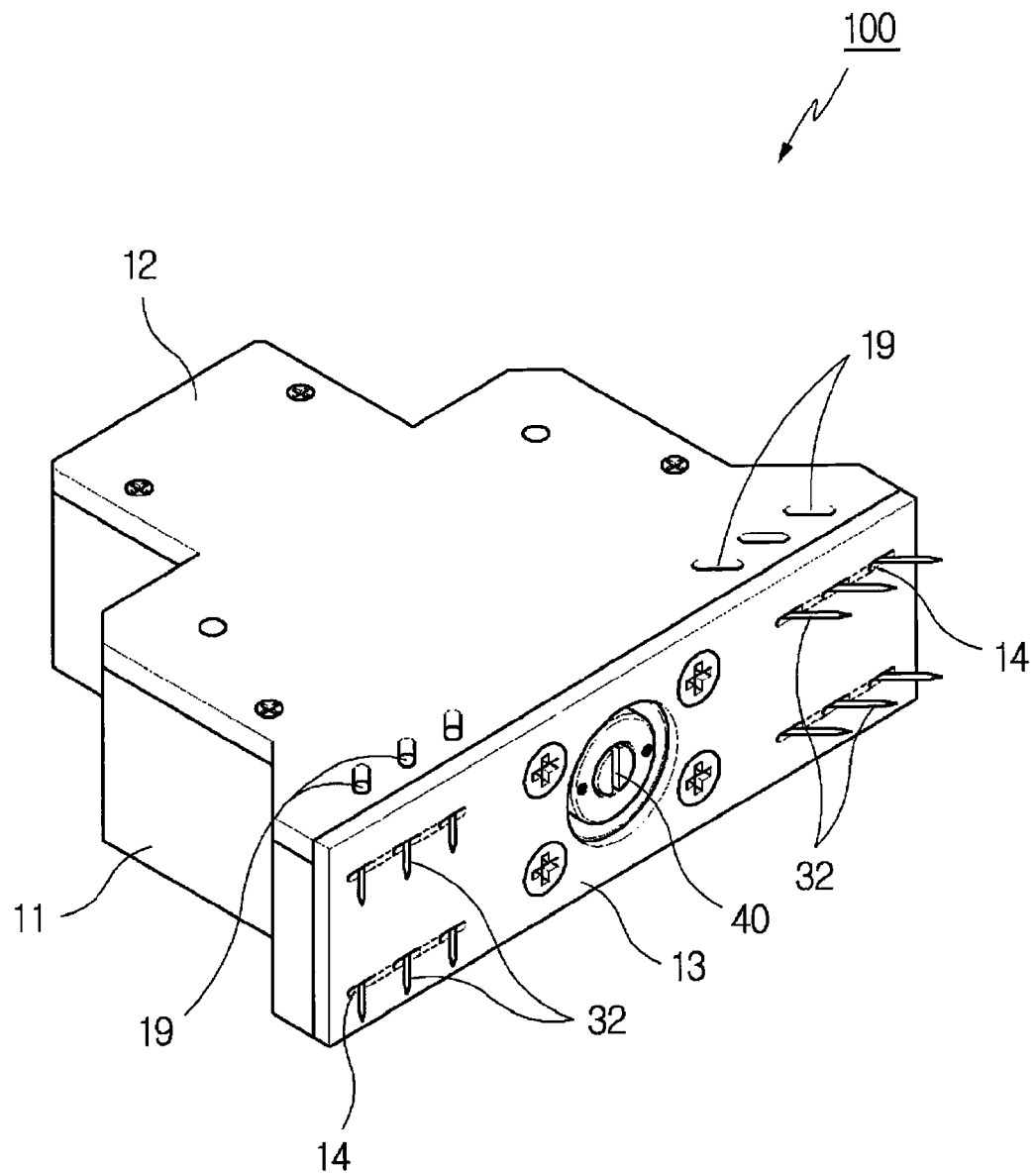
FIG. 2 is a view showing an external shape of a pin-type gripper, according to the present invention.

The above and other objects, features and advantages of the present invention will be more clearly understood from the following detailed description taken in conjunction with the accompanying drawings. In FIG. 2 and the following drawings, a pin-type gripper according to the present invention is designated by reference numeral 100.

Figure 3:
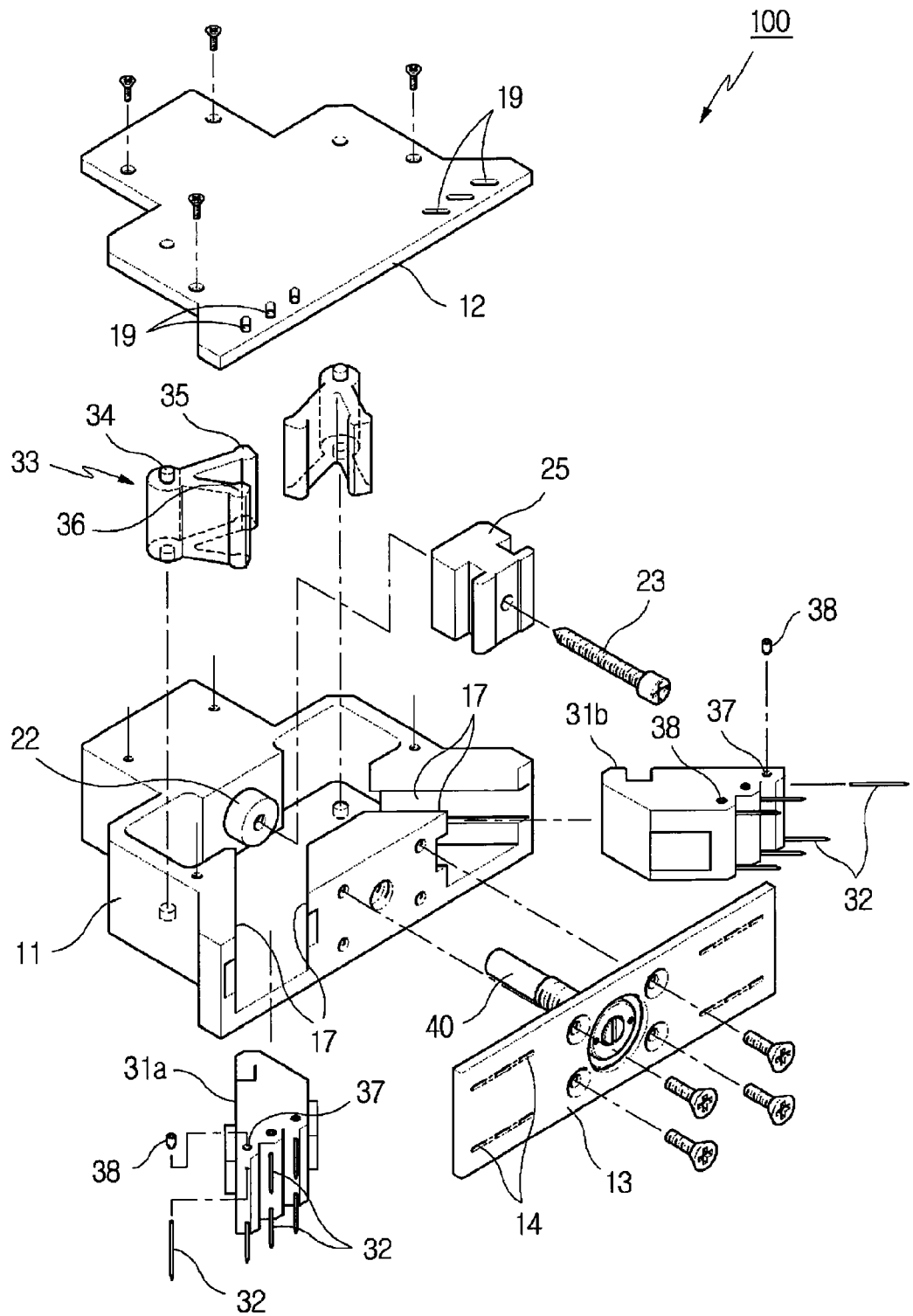
FIG. 3 is an exploded perspective view of FIG. 2.
Figure 4:
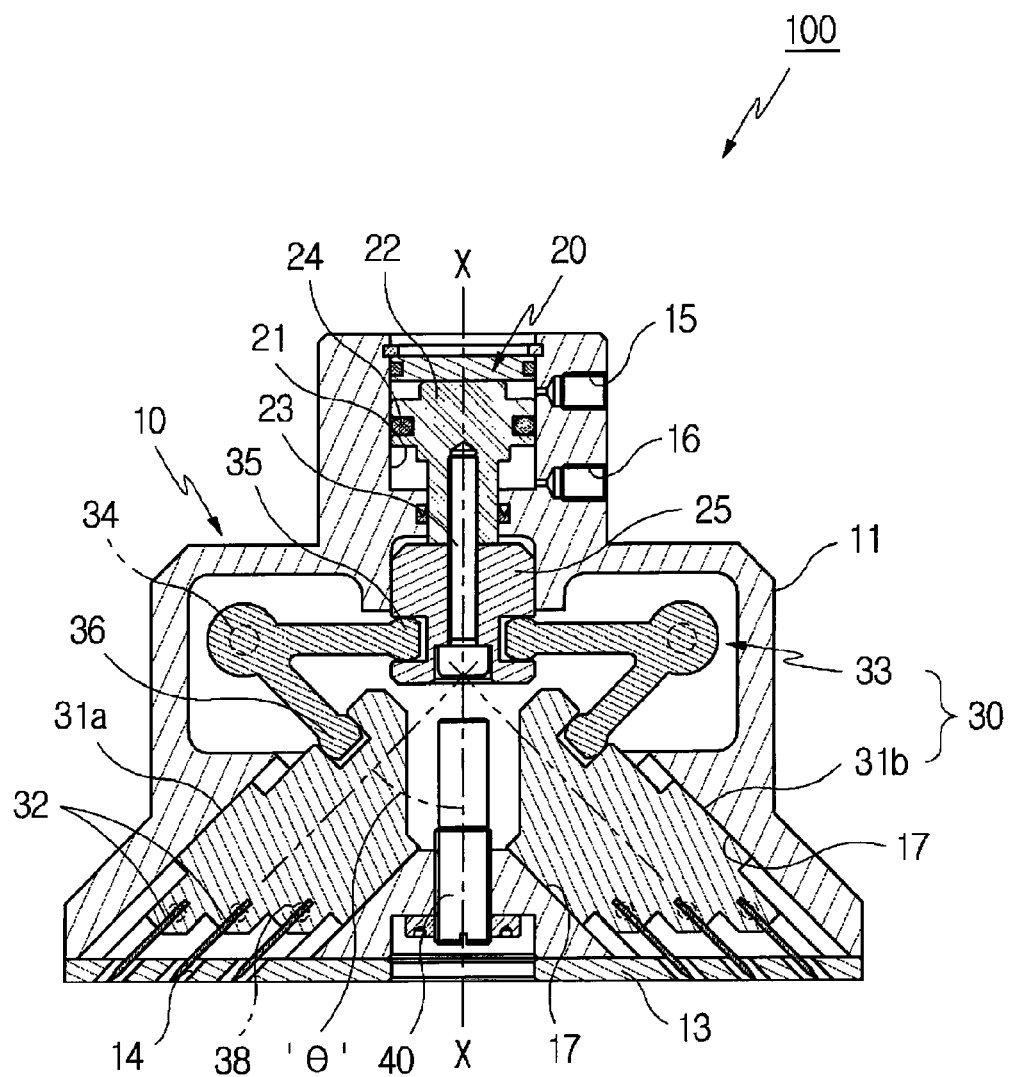
FIG. 4 is a sectional view of the gripper of FIG. 2.

Referring to FIGS. 2 through 4, the pin-type gripper 100 according to the present invention includes a housing 10, and a cylinder unit 20 and an actuating part 30 which are organically installed in the housing 10. The gripper 100 of the present invention is provided with the only single cylinder unit 20.

A body 11 of the housing 10 has an internal space which is optimally designed to allow the cylinder unit 20 and the actuating part 30 to be installed and operated in the body 11. The body 11 is closed by a side cover 12 and a bottom plate 13. The bottom plate 13 is the bottom of the housing 10. A plurality of pin-holes 14 are formed in the bottom 13 of the housing 10. Pins 32 of slide blocks 31a and 31b are retracted into or extracted from the housing 10 through the corresponding pin-holes 14.

The pin-holes 14 and the pins 32 may be designed by one method selected from among a variety of methods in consideration of one-to-one or several-for-one correspondence, without being limited to the embodiment shown in the drawings.

The cylinder unit 20 includes a cylinder 21 which is disposed in an upper end of a medial portion of the housing 10, a piston 22 which reciprocates up and down in the cylinder 21, and a rod 23 which is fixed to the piston 22 and extends downwards from the cylinder 21. The rod 23 may be integrated with the piston 22. Reference numeral 24 denotes a ring which is fitted over a circumferential outer surface of the piston 22 to prevent space above the piston 22 in the cylinder 21 and space below it therein from communicating with each other.

As shown in the drawings, the cylinder 21 of this embodiment is provided by forming the upper end of the housing 10 into a cylindrical shape. In another embodiment, a cylinder may be installed in the housing 10 after it has been separately manufactured.

A movable block 25 is coupled to an end of the piston rod 23. The movable block 25 is provided merely for the sake of convenient connection of links 33 to the piston rod 23. However, the rod 23 and the movable block 25 may be integrated with each other. Moreover, the present invention is not limited to the fact that the movable block 25 must be present. Therefore, in the present invention, the movable block 25 is not regarded as being a separate construction which is independent from the rod 23.

The actuating part 30 includes the two slanted slide blocks 31a and 31b which are symmetrically disposed on opposite sides of a center axis X-X of the piston rod 23 with the same slant angle θ, and the links 33 which transmit movement of the piston 22 to the slide blocks 31a and 31b. Pegging pins 32 are provided on an end of each slide block 31a, 31b.

In detail, the two slanted slide blocks 31a and 31b are provided adjacent to the end of the piston rod 23, are symmetrically disposed at the left and right sides, and are oriented to be inclined at the same angle θ. The two slanted slide blocks 31a and 31b slide due to the movement of the piston 22 to expand in a skirt shape. To make the sliding movement of the slanted slide blocks 31a and 31b smooth, it is preferable that guides 17 which previously set locations and inclination angles θ of the blocks 31a and 31b are formed in the body 11 of the housing 10.

The pegging pins 32 are longitudinally provided in the end of each slide block 31a, 31b so that, when the blocks 31a and 31b expand, the pegging pins 32 can be pegged into a surface of a target at predetermined angles.

Meanwhile, a first end 35 of each link 33 is connected to the rod 23, and a second end 36 thereof is connected to the corresponding block 31a, 31b. Thus, the movement of the piston 22 is transmitted to the blocks 31a and 31b by the links 33. In detail, each link 33 is a 'v'-shaped member having a vertex 34 as a rotating axis. The first end 35 and the second end 36 respectively form opposite ends of the V-shaped member other than the vertex 34.

Preferably, the connection between the first end 35 of the link 33 and the rod 23 and the connection between the second end 36 and the corresponding block 31a, 31b are embodied by a ball-joint connection method.

The pin-type gripper 100 according to the embodiment of the present invention further includes a stopper 40 which adjusts the extent by which the pins 32 are extracted from the housing 10. The stopper 40 is mounted to a central portion of the bottom of the housing 10 so as to be adjustable in height. The stopper 40 extends adjacent to the end of the rod 23 along the center axis X-X. When the piston rod 23 is extracted, the stopper 40 is brought into contact with the end of the piston rod 23 that is moving. As such, the stopper 40 functions to limit a movement range of the rod 23. More specifically, it defines a lower limit of the movement range. The extent by which the pegging pins 32 are extracted from the housing 10 can be controlled by adjusting the height the stopper 40.

Although the stopper 40 is illustrated as using a screw coupling method for the sake of convenient installation and height adjustment, the present invention is not limited to this method.

The actuating part 30 is operated depending on movement of the piston 22 of the cylinder unit 20. In this embodiment, the piston 22 reciprocates by a means of the pressure of compression air which is supplied into the cylinder 21. For this, the housing 10 includes two compression air supply holes 15 and 16 which extend from the side surface of the body 11 into the cylinder 21 and respectively communicate with the upper space above the piston 22 in the cylinder 21 and the lower space below the piston 22 therein.

Referring to FIG. 3, each pin 32 is fixed in the corresponding slide block 31a, 31b by a bolt 38 tightened into a corresponding one of side bolt holes 37 which are formed in the side surface of the slide block 31a, 31b. On the contrary to this, the pin 32 can be released by loosening the bolt 38 so as to enable the pin 32 to be removed from the slide block 31a, 31b or replaced with another one. Work holes 19 are formed in the side cover 12 of the housing 10 at positions corresponding to the bolts 38 to allow the user to handle the bolts 38. Work using a tool (e.g. a wrench) to tighten/loosen the bolts 38 can be facilitated through the work holes 19.

Figure 5:
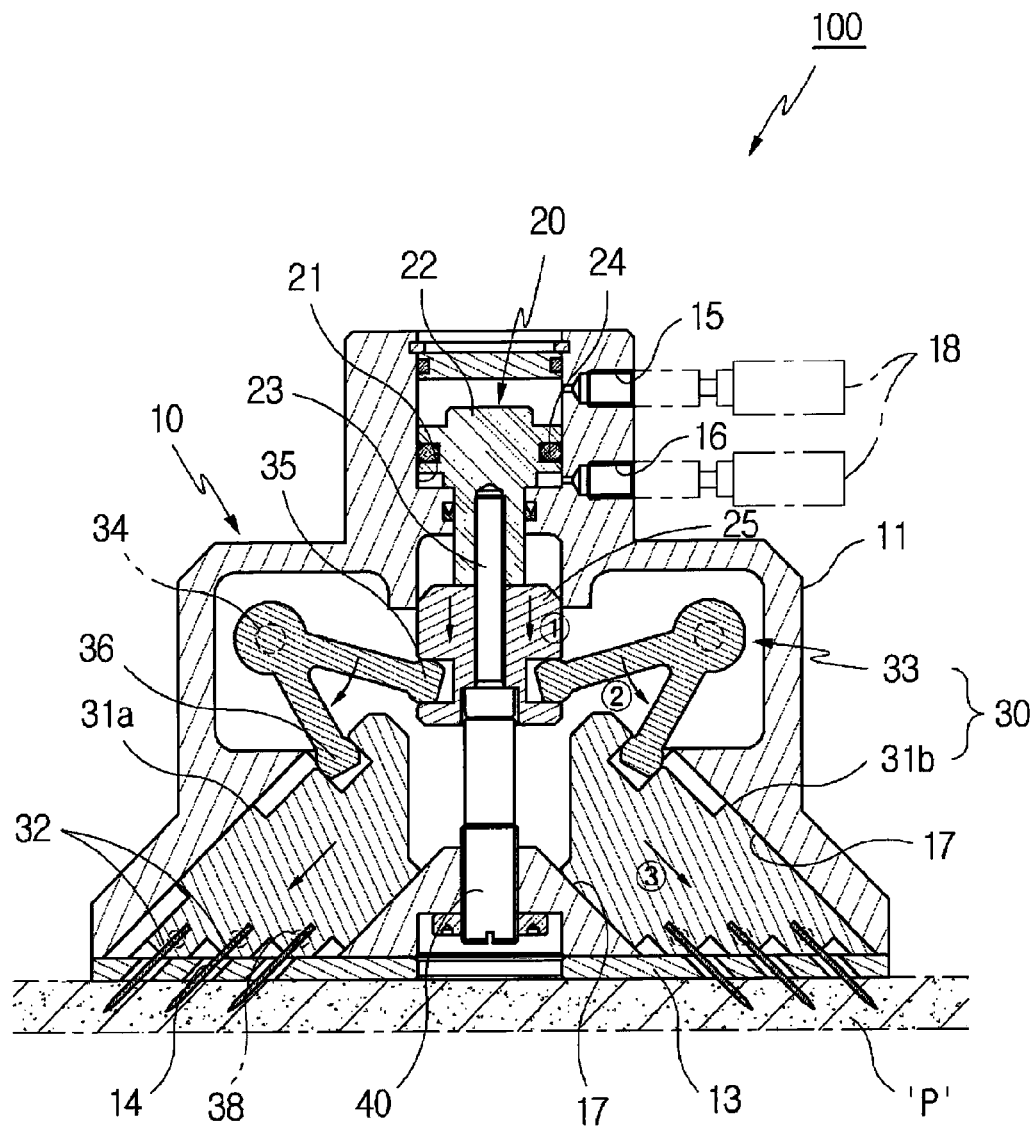
FIG. 5 is a view illustrating the operation of the pin-type gripper according to the present invention.

Referring to FIG. 5, a connector 18 is mounted to each supply hole 15, 16 to connect a compression air supply line thereto and smoothly supply compression air into the cylinder 10. Supply of compression air is controlled by a separate air supply system in such a way that compression air is alternately supplied to the first supply hole 15 and the second supply hole 16. Meanwhile, to transfer the target P, the pin-type gripper 100 of the present invention is first disposed such that the bottom 13 comes into contact with the surface of the target P.

In this state, compression air is first supplied into the cylinder 21 through the first supply hole 15. The compression air that has been supplied into the cylinder 21 compresses an upper surface of the piston 22. Then, the piston 22 and the rod 23 move downwards (in the direction of arrow ①) until the end of the rod 23 comes into contact with the stopper 40 which is disposed below the rod 23.

Thereby, the 'V'-shaped links 33, the first ends 35 of which are connected to the piston rod 23 are rotated on the vertexes 34. Here, each link 33 is rotated downwards (in the direction of arrow ②) corresponding to the direction of the movement of the piston rod 23. When the links 33 rotate downwards, the slide blocks 31a and 31b which are connected to the second ends 36 of the links 33 move obliquely downwards along the guides 17 and extend in a skirt shape (in the directions of arrow ③).

When the slide blocks 31a and 31b extend, the pegging pins 32 provided on the ends of the blocks 31a and 31b protrude outwards from the bottom 13 of the housing 10 through the pin-holes 14 and peg into the surface of the target P. As shown in the drawings, the pins 32 of the two blocks 31a and 31b peg into the target P in the opposite directions, thus making it possible to hold, lift and transfer the target P using the pin-type gripper 100 of the present invention.

Depending on the kind, material, size, etc. of the target P, it is necessary to control the extent by which the pegging pins 32 are extracted from the housing 10. In this embodiment, the extent by which the pegging pins 32 are extracted can be set by rotating the stopper 40 to the left or the right and adjusting the height of the stopper 40. That is, if the height of the stopper 40 is adjusted, the lower limit of the movement range of the rod 23 changes, whereby the distance that the blocks 31a and 31b connected to the rod 23 by the links 33 can move also changes, thus adjusting the extent by which the pegging pins 32 are extracted.

After the transfer of the target P has been completed, compression air is supplied into the cylinder 21 through the second supply hole 16. The compression air that has been supplied into the cylinder 21 through the second supply hole 16 compresses a lower surface of the piston 22. Then, the piston 22 and the rod 23 move upwards (in a direction opposite to the direction of arrow ①). The 'V'-shaped links 33, the first ends 35 of which are connected to the rod 23, are rotated on the vertexes 34 by the movement of the rod 23.

Of course, each link 33 rotates upwards (in a direction opposite to the direction of arrow ②) corresponding to the direction of the movement of the piston rod 23. When the links 33 rotate upwards, the slide blocks 31a and 31b which are connected to the respective second ends 36 of the links 33 move upwards along the guides 17 (in a direction opposite to the direction of arrow ③), thus reducing the extended range.

When the slide blocks 31a and 31b contract, the pins 32 which have been extracted outwards are retracted into the housing 10. At this time, because the target P is put into contact with the bottom 13 of the housing 10, the target P is separated from the pins 32 without being moved from the transferred location. Subsequently, the pin-type gripper 100 of the present invention prepares for subsequent transfer.

The invention claimed is:

1. A pin-type gripper, comprising:
    a housing in which a cylinder unit and an actuating part are organically arranged, with pin holes formed in a bottom of the housing so that pins of slide blocks are extracted from or retracted into the housing through the pin holes;
    the single cylinder unit comprising: a cylinder provided in an upper end of a medial portion of the housing; a piston reciprocating upwards and downwards in the cylinder; and a rod extending from the piston to a predetermined position below the cylinder; and
    the actuating part comprising: a pair of slide blocks obliquely disposed at left and right sides of an end of the rod, the slide blocks extending in a skirt shape, with one or more pins provided in an end of each of the pair of slide blocks; and links connected at first ends thereof to the rod and connected at second ends thereof to the respective slide blocks so that movement of the rod generated by the cylinder is transmitted to the slide blocks by the links.

2. The pin-type gripper according to claim 1, wherein the housing has two compression air supply holes extending from a side surface of the housing into the cylinder, the two compression air supply holes respectively communicating with an upper space above the piston and a lower space below the piston,
    wherein the piston is moved upwards or downwards by pressure of compression air supplied into the cylinder through either of the compression air supply holes.

3. The pin-type gripper according to claim 1, wherein each of the links comprises a 'v'-shaped member having a vertex as a rotating axis, wherein the first end and the second end of the link respectively form opposite ends of the V-shaped member other than the vertex.

4. The pin-type gripper according to claim 1, wherein the housing comprises a guide formed to set locations of the slide blocks and angles at which the slide blocks slide.

5. The pin-type gripper according to claim 1, further comprising
    a stopper provided in the bottom of the housing so as to be adjustable in height, the stopper extending to a predetermined position adjacent to the end of the rod such that when the rod moves to the predetermined position, the stopper is brought into contact with the end of the rod, whereby a lower limit of a movement range of the rod is defined.

6. The pin-type gripper according to claim 1, wherein each of the pins is fixed in the corresponding slide block by a bolt tightened into a bolt hole formed in a side surface of the slide block and is released by loosening the bolt to allow the pin to be removed from the slide block or replaced with another one, and
    the housing has a work hole formed at a position corresponding to the bolt in a shape that allows to handle the bolt.

* * * * *